March 18, 1969                                                   3,433,729
LEV MIKHAILOVICH PROSKURYAKOV ET AL
APPARATUS FOR PRODUCING HYDROGEN AND OXYGEN
Filed Feb. 16, 1966
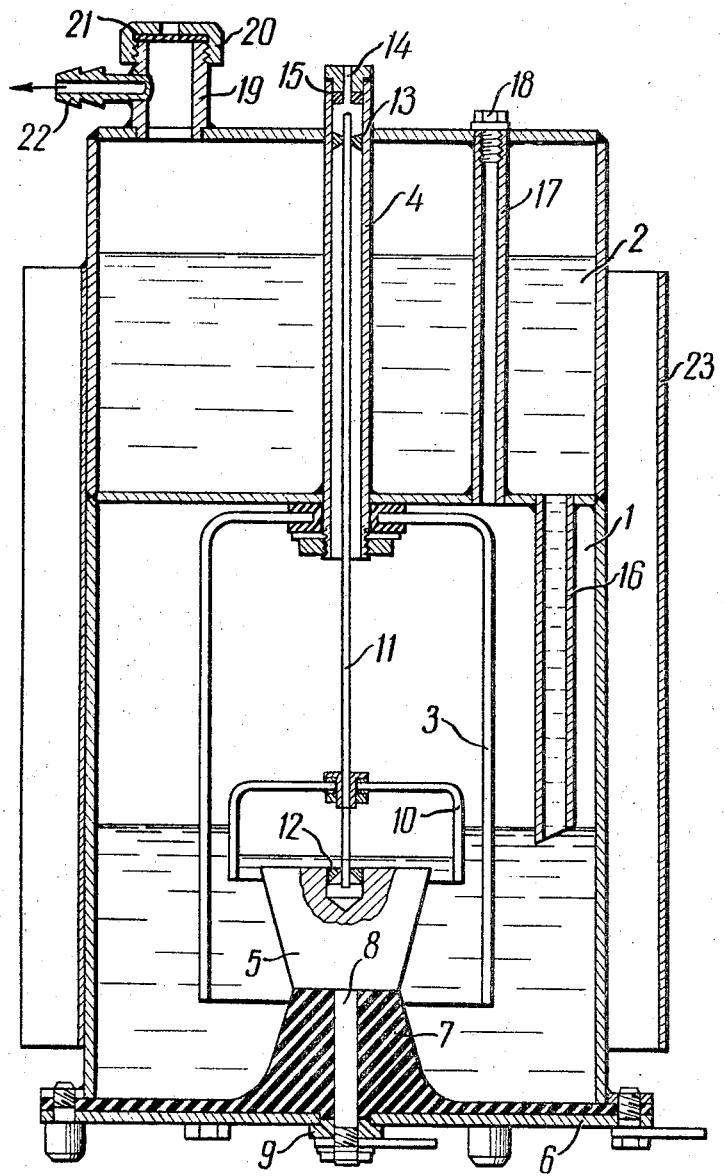

United States Patent Office 3,433,729
Patented Mar. 18, 1969

3,433,729
APPARATUS FOR PRODUCING HYDROGEN AND OXYGEN
Lev Mikhailovich Proskuryakov, Ul. Pervomaiskaya 81/1, kv. 29, and Valentin Grigorievich Zizin, Ul. Kalinina 63, kv. 22, both of Ufa, U.S.S.R.
Filed Feb. 16, 1966, Ser. No. 527,781
U.S. Cl. 204—278
Int. Cl. C01b 13/06
7 Claims

ABSTRACT OF THE DISCLOSURE

An apparatus for electrolyzing water to produce hydrogen and oxygen under pressure. The electrolytic cell acts as an electrode and has a bell jar in it which contains a second electrode. Gas delivery tubes are connected to the cell and to the inside of the bell jar. A valve is located in the bell jar gas delivery tube and actuated by a float in the bell jar above the electrode to ensure equalization of gas pressures in the bell jar and a gas consuming system.

This invention relates to apparatus for the production of hydrogen and oxygen under pressure by the electrolytic decomposition of water.

Said apparatus may find wide application as a source of carrier gas for chromatographic analysis, as a source of oxygen for elementary analysis, and in all cases, especially in laboratory and research practice, where electrolytically pure hydrogen and oxygen are required under pressure at a constant rate, the latter depending on the current intensity.

Prior art apparatus for the production of hydrogen and oxygen by the electrolysis of water, comprising a cell for the electrolyte with gas delivery tubes and electrodes connected to a source of direct current, cannot insure production of gas under pressure for any considerable length of time. Electrolyzers in which advantage is taken of the phenomenon of hydrogen diffusion and its subsequent penetration through a porous cathode enable hydrogen to be obtained at a slightly elevated pressure, but require periodic removal of the oxygen which accumulates in the unit. Apparatus employing hydrogen diffusion require the use of expensive and rather critical materials (platinum, palladium, silver) and involve complex techniques for the manufacture of the diffusion cathode.

It is an object of this invention to develop a portable and reliable apparatus for the production of electrolytically pure hydrogen and oxygen under pressure.

Another object of this invention is to provide an apparatus that will automatically maintain the pressure of the gas produced depending on the preset capacity and resistance of the system consuming the gas, without the use of special automation and control devices.

Still another object of the invention is to provide an apparatus insuring continuous operation and not requiring the use of expensive materials for its manufacture.

A further object of the invention is to provide an apparatus which will stop automatically if its outlet valve is clogged.

Said and other objects are accomplished by employing an apparatus for the production of hydrogen and oxygen by the electrolysis of water, comprising an electrolyte cell with gas delivery tubes and electrodes connected to a source of direct current, wherein, according to the invention, the cell which serves as one of the electrodes contains a bell jar communicating with the atmosphere through a throttling device, the other electrode and a float being arranged inside said bell jar, said float controlling the operation of the throttling device and automatically adjusting the pressure to equal the resistance in the system consuming the gas.

In a preferred embodiment of the apparatus a water reservoir is installed above the cell to insure continuous operation of the apparatus, said reservoir communicating with the inside of the cell and providing automatic addition of water to the electrolyte as it is consumed during electrolysis. The reservoir communicates with the inside of the cell through the gas delivery tube, the lower end of which is arranged slightly above the electrode in the bell jar, insuring maintenance of a preset level of electrolyte in the cell.

The throttling device is a valve with its seat fixed in the gas delivery tube communicating with the inside of the bell jar, and with its needle-shaped closing member fixed to the float.

The central electrode is arranged inside the bell jar so that the edges of the bell jar are slightly below the working part of the electrode, the latter being fixed to the bottom of the cell through a sealing gasket.

The cell of the apparatus is one of the electrodes and is cylindrical in shape, having a radiator on its outer surface.

The proposed apparatus insures continuous production of electrolytically pure hydrogen and oxygen under a pressure limited by the strength of the material used for making the cell and the reservoir.

The capacity of the apparatus depends upon the current intensity used.

Hereinbelow the invention is explained by a detailed description and a drawing of a preferred embodiment of the apparatus. The drawing shows the apparatus in longitudinal section.

The apparatus comprises a cell 1 and a water reservoir 2 arranged above the cell 1. The cell 1 and the reservoir 2 are cylindrical in shape. A bell jar 3 is arranged inside the cell 1, fastened in its upper part to a gas delivery tube 4 through which the inside of the bell jar 3 communicates with the atmosphere. A truncated-cone electrode 5 is arranged concentrically in the bell jar so that the edges of the bell jar 3 are slightly below the working part of the electrode 5. The electrode 5 is fixed to the cell bottom 6 through sealing gasket 7 by means of a pin 8 insulated from the bottom 6 by means of a washer 9. The pin 8 serves as the lead-in for conducting current to the electrode 5. Above the electrode 5 is a bell-type float 10 with a needle 11 which passes through the tube 4 and is kept centered by means of bushings 12 and 13.

The tube 4 has an opening 14 at the top, fitted with a valve seat 15 of an elastic material, closed by the needle 11. A tube 16 is arranged in the space between the wall of the bell jar 3 and the wall of the cell 1, with its upper end fastened to the reservoir 2 and its lower end slightly above the electrode 5, thus determining the electrolyte level. Said space communicates with the atmosphere by means of a tube 17 passing through the reservoir 2 and closed with a plug 18. In the upper part of the reservoir 2 is arranged a pipe 19 with a cap 20 with a hole in it and a rubber gasket 21 which serves as a safety (rupture) valve, and a union 22 for delivering the resulting gas (hydrogen or oxygen).

The outside surface of the cell 1 and the reservoir 2 is encircled with a radiator 23.

The apparatus is filled with an electrolyte, say, a 25% solution of potassium hydroxide to complete displacement of the air from the apparatus, through the pipe 19 after unscrewing the cap 18. The cap 18 is then screwed back in place and the apparatus is connected to a source of direct current. If it is desired to obtain hydrogen the positive pole of the source is connected to the electrode 5, and the negative, to the cell 1, which in this case is the cathode.

When the current source is connected hydrogen will begin to evolve on the walls of the cell 1, and oxygen will be liberated at the anode. The liberated hydrogen raises the pressure inside the cell 1 and displaces the electrolyte to the level of the lower end of the tube 16, at which moment hydrogen will begin to bubble into the reservoir 2. When this takes place the electrolyte is decanted completely from the reservoir 2 with the aid of a siphon, and the reservoir 2 is filled with distilled water through the pipe 19; the cap 20 is then screwed on to the pipe 19 and the gas consumer is connected to the union 22.

When in operation, the pressure in the apparatus is built up automatically to the level of the resistance in the gas-consuming system as follows: as the hydrogen pressure increases, the electrolyte level in the bell jar 3 rises, lifting the float 10, and the needle 11 closes the opening 14, while the accumulating oxygen raises the pressure and lowers the level of the electrolyte under the bell jar 3. When electrolyte level drops the float 10 descends, the needle 11 opens the opening 14 and the excess oxygen is discharged into the atmosphere. This causes the level of the electrolyte under the bell jar 3 to rise and makes the needle 11 reclose the opening 14. The pressure of the oxygen under the bell jar 3 is maintained automatically depending on the hydrogen pressure.

As the water of the electrolyte is consumed the level of the latter drops, as a result of which the electrolyte surface falls away from the bottom end of the tube 16 and water begins to flow from the reservoir 2 into the cell 1 until the necessary level of the electrolyte is restored.

Thus, the tube 16 serves for feeding water to the electrolyte and is also a gas delivery tube, guaranteeing maintenance of the electrolyte level depending on the position of the lower end of the tube 16.

If the oxygen discharge opening 14 is clogged the pressure will rise and lower the level of the electrolyte under the bell jar 3, thus baring the central electrode 5 and thereby breaking the electric circuit and stopping the apparatus.

It should be pointed out that only water is consumed during the operation of the apparatus, so that alkali need be added only once.

Both hydrogen and oxygen may be utilized simultaneously under pressure, provided that the gas produced under the bell jar is drawn off at a pressure below the pressure of the gas drawn off from inside the cell.

What is claimed is:

1. An apparatus for producing hydrogen and oxygen by the electrolysis of water, comprising an electrolyte cell which is one of the electrodes; a second electrode fixed to the bottom of said cell; a bell jar which is fixed inside said cell and inside which said electrode is arranged, said bell jar dividing the cell into the anode and cathode spaces which communicate hydraulically through the electrolyte; gas delivery tubes one of which is arranged in said cell, and the other connected to the inside of said bell jar, communicating it with the atmosphere; a means of maintaining the gas pressure under said bell jar equal to the resistance of the gas-consuming system and throttling the gas delivery tube communicating the bell jar with the atmosphere.

2. An apparatus according to claim 1 in which the arrangement of said electrode inside the bell jar is such that the edges of the bell jar are slightly below the working part of said electrode fixed to the bottom of the cell through a sealing gasket.

3. An apparatus according to claim 1 in which said cell, being one of the electrodes, is cylindrical in shape.

4. An apparatus for producing hydrogen and oxygen under pressure by the electrolysis of water, comprising an electrolyte cell which is one of the electrodes; a second electrode fixed to the bottom of said cell; a bell jar which is fixed inside said cell and inside which said electrode is arranged, said bell jar dividing the cell into the anode and cathode spaces which communicate hydraulically through the electrolyte; gas delivery tubes one of which is arranged in said cell, and the other connected to the inside of said bell jar, communicating it with the atmosphere; a float arranged in the bell jar above the electrode; a throttling device comprising a valve the seat of which is fixed in said gas delivery tube communicating with the inside of the bell jar, while the closing member is a needle fixed to said float, ensuring maintenance of the gas pressure under the bell jar equal to the resistance of the gas-consuming system.

5. An apparatus for producing hydrogen and oxygen under pressure by the electrolysis of water, comprising an electrolyte cell which is one of the electrodes; a second electrode fixed to the bottom of said cell; a bell jar which is fixed inside said cell and inside which said electrode is arranged, said bell jar dividing the cell into the anode and cathode spaces which communicate hydraulically through the electrolyte; gas delivery tubes, one of which is arranged in said cell, and the other connected to the inside of said bell jar communicating it with the atmosphere; a means of maintaining the gas pressure under said bell jar equal to the resistance of the gas-consuming system and throttling the gas delivery tube communicating the bell jar with the atmosphere; a water reservoir arranged above said cell communicating with the inside of said cell and providing automatic feeding of water to the electrolyte as it is consumed.

6. An apparatus for producing hydrogen and oxygen under pressure by the electrolysis of water, comprising an electrolyte cell which is one of the electrodes; a second electrode fixed to the bottom of said cell; a bell jar which is fixed inside said cell and inside which said electrode is arranged, said bell jar dividing the cell into the anode and cathode spaces which communicate hydraulically through the electrolyte; gas delivery tubes one of which is arranged in said cell and the other connected to the inside of said bell jar, communicating it with the atmosphere; a means of maintaining the gas pressure under said bell jar, equal to the resistance of the gas-consuming system and throttling the gas delivery tube communicating the bell jar with the atmosphere; a water reservoir communicating with the inside of said cell through said gas delivery tube arranged in the cell, the lower end of said tube being placed slightly above the electrode arranged inside the bell bar.

7. An apparatus for producing hydrogen and oxygen under pressure by the electrolysis of water, comprising an electrolyte cell which is one of the electrodes; a second electrode fixed to the bottom of said cell; a bell jar which is fixed inside said cell and inside which said electrode fixed to the bottom of the cell is arranged, said bell jar dividing the cell into the anode and cathode spaces which communicate hydraulically through the electrolyte; gas delivery tubes one of which is arranged inside said cell, and the other connected to the inside of said bell jar, communicating it with the atmosphere; a means of maintaining the gas pressure under said bell jar, equal to the resistance of the gas-consuming system; a water reservoir arranged above said cell, communicating with the inside of the cell and providing automatic feeding of water to the electrolyte as it is consumed; a means of removing heat from the surface of the cell, arranged on the outer surface of said cell.

References Cited

UNITED STATES PATENTS

| | | | |
|---|---|---|---|
| 1,032,623 | 7/1912 | Reed | 204—278 XR |
| 1,380,183 | 5/1921 | Boisen | 204—278 |
| 1,905,627 | 4/1933 | Holland | 204—278 |
| 2,079,950 | 5/1937 | Negus | 204—271 XR |
| 3,330,755 | 7/1967 | Mahany | 204—272 XR |

FOREIGN PATENTS 868,314 12/1941 France.

JOHN H. MACK, *Primary Examiner.*

D. R. JORDAN, *Assistant Examiner.*

U.S. Cl. X.R.

204—129, 272